(12) United States Patent
Critsinelis et al.

(10) Patent No.: US 8,820,412 B2
(45) Date of Patent: Sep. 2, 2014

(54) METHODS, SYSTEMS AND APPARATUS FOR CIRCULATING FLUID WITHIN THE ANNULUS OF A FLEXIBLE PIPE RISER

(75) Inventors: Antonio C. F. Critsinelis, Kingwood, TX (US); Christopher A. Kassner, Houston, TX (US); Farzan Parsinejad, Houston, TX (US); Ahmed Omar, Katy, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 210 days.

(21) Appl. No.: 13/234,279

(22) Filed: Sep. 16, 2011

(65) Prior Publication Data

US 2013/0068464 A1     Mar. 21, 2013

(51) Int. Cl.
*E21B 17/01*     (2006.01)
*E21B 41/04*     (2006.01)

(52) U.S. Cl.
CPC ............... *E21B 17/01* (2013.01); *E21B 41/04* (2013.01)
USPC ............ 166/367; 166/350; 166/344; 166/359

(58) Field of Classification Search
CPC ................................. E21B 17/01; E21B 41/04
USPC ......... 166/335, 344, 345, 346, 347, 350, 359, 166/367; 405/224.2, 224.3
See application file for complete search history.

(56) References Cited

U.S. PATENT DOCUMENTS

| | | | | |
|---|---|---|---|---|
| 4,383,554 A | * | 5/1983 | Merriman | 138/101 |
| 4,728,224 A | * | 3/1988 | Salama et al. | 405/224.2 |
| 6,551,029 B2 | * | 4/2003 | Shu et al. | 405/211 |
| 8,147,937 B2 | * | 4/2012 | Brisson et al. | 428/36.3 |
| 8,176,985 B2 | * | 5/2012 | Humphreys | 166/358 |
| 2003/0079481 A1 | * | 5/2003 | Cooper | 62/50.7 |
| 2008/0149209 A1 | * | 6/2008 | Felix-Henry | 138/127 |
| 2011/0026031 A1 | | 2/2011 | Kristiansen et al. | 356/440 |
| 2011/0113884 A1 | * | 5/2011 | Marsden et al. | 73/623 |
| 2011/0153225 A1 | | 6/2011 | Mangal et al. | 702/24 |
| 2011/0192485 A1 | * | 8/2011 | Graham | 138/129 |

FOREIGN PATENT DOCUMENTS

| | | | | |
|---|---|---|---|---|
| EP | 341144 A1 | * | 11/1989 | F16L 11/12 |
| EP | 1492936 | | 1/2005 | E21B 17/01 |
| EP | 1608904 | | 12/2005 | F16L 11/083 |
| WO | 2010067092 | | 6/2010 | F16L 1/12 |
| WO | 2010084035 | | 7/2010 | B61L 25/02 |
| WO | WO 2011/026801 A1 | * | 3/2011 | F16I 11/08 |

OTHER PUBLICATIONS

PCT/US2012/041527, International Search Report, mailing date Jun. 26, 2013, pp. 1-12.

(Continued)

*Primary Examiner* — James Sayre
(74) *Attorney, Agent, or Firm* — Karen R. DiDomenicis; Melissa Patangia

(57) ABSTRACT

Disclosed are methods, systems and apparatus for circulating fluid within the annulus of a flexible pipe used in a riser in an offshore hydrocarbon production facility. Fluid, such corrosion inhibitors, can be introduced into the annulus by pumping fluid from a storage tank located on a platform or vessel into tubes within the annulus. Use of the system to flow the fluid through the annulus can prevent or reduce corrosion of the steel members within the annulus and increase the fatigue life of the riser.

17 Claims, 9 Drawing Sheets

(56) References Cited

OTHER PUBLICATIONS

Developments in Managing Flexible Risers and Pipelines, a Suppliers Perspective, C.S. Dahl, B. Andersen and M. Groenne, Offshore Technology Conference, May 2011.

On the Beneficial Influence of a Very Low Supply of H2S on the Hydrogen Embrittlement Resistance of Carbon Steel Wires in Flexible Pipe Annulus, N. Desamais and C. Taravel-Condat, Offshore Technology Conference, May 2009.

Development and Testing of Non-Bonded Flexible Pipe for High Temperature/High Pressure/Deepwater/Dynamic Sour Service Applications, Mark Kalman, John Belcher, Bin Chen, Dana Fraser, Andrew Ethridge, Cobie Loper, Offshore Technology Conference, May 1996.

MOLDI™: A Fluid Permeation Model to Calculate the Annulus Composition in Flexible Pipes: Validation with Medium Scale Tests, Full Scale Tests and Field Cases, C. Taravel-Condat, M. Guichard, J. Martin, Proceedings of OMAE03, 22nd International Conference on Offshore Mechanics and Arctic Engineering, Jun. 2003.

Offshore Pipeline and Riser Integrity—the Big Issues, Jonathan Marsh, Phil Duncan, Ian MacLeod, Society of Petroleum Engineers, Sep. 2009.

Comparison of Models to Predict the Annulus Conditions of Flexible Pipe, S. Last, S. Groves, J. Rigaud, C. Taravel-Condat, J. Wedel-Heinen, R. Clements, S. Buchner, Offshore Technology Conference, May 2002.

* cited by examiner

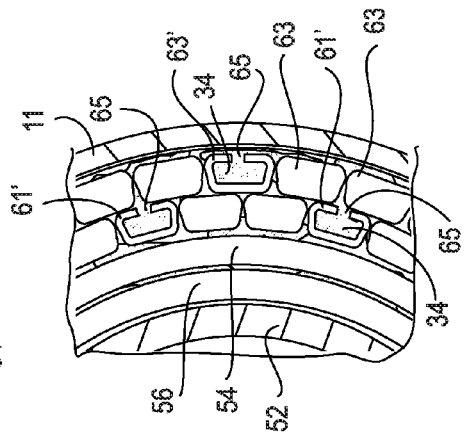
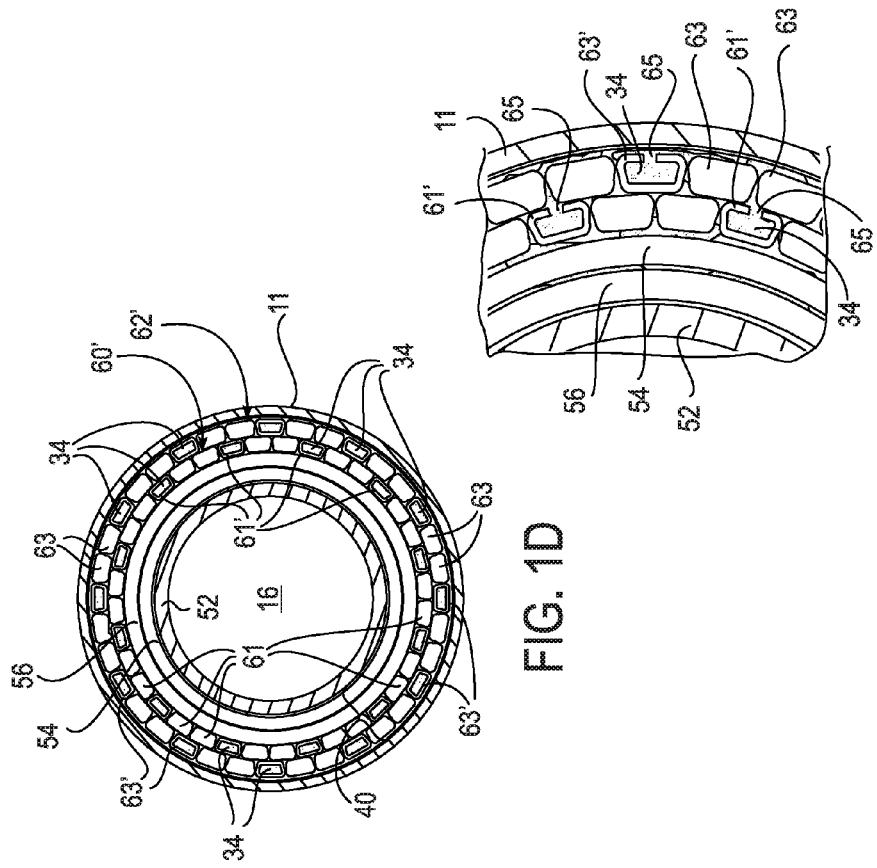
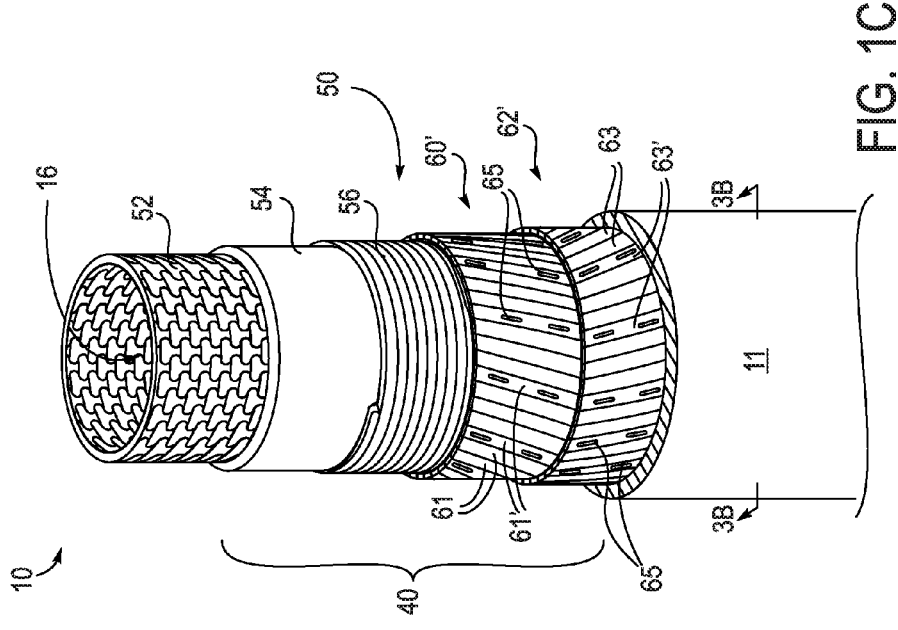

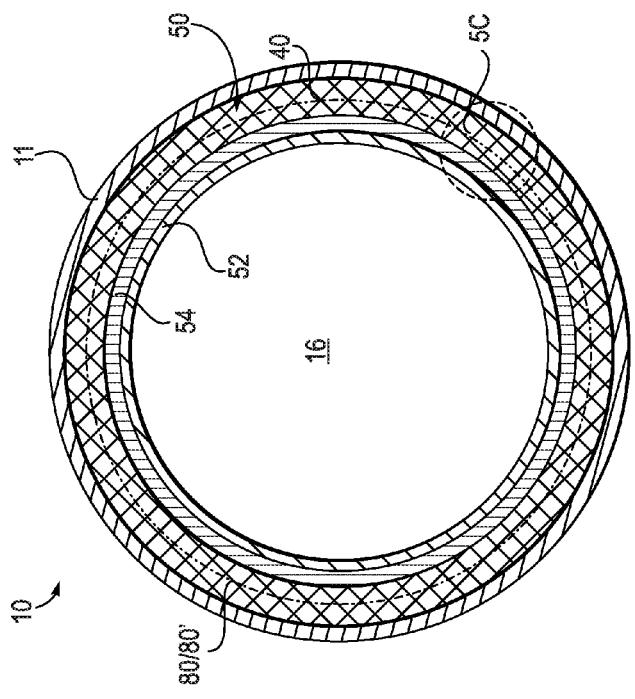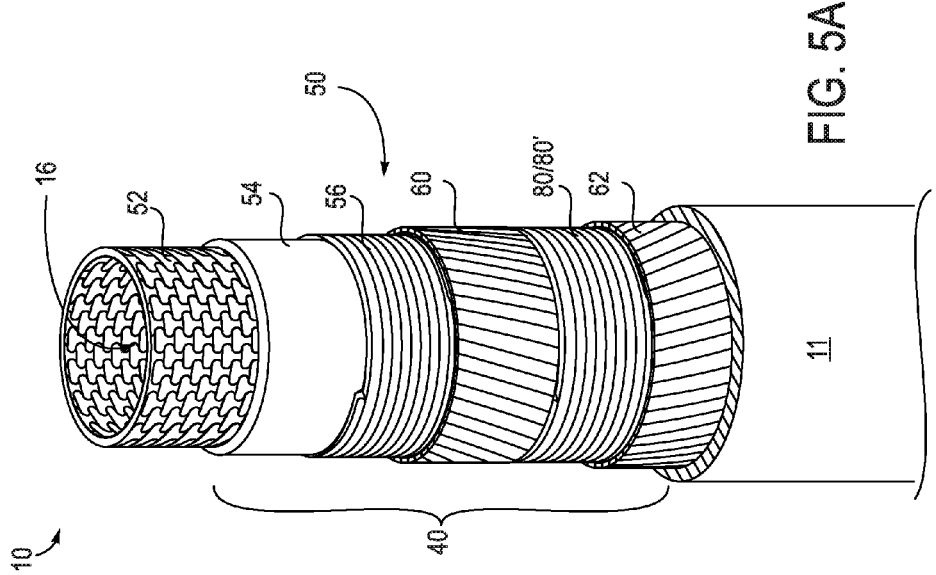

METHODS, SYSTEMS AND APPARATUS FOR CIRCULATING FLUID WITHIN THE ANNULUS OF A FLEXIBLE PIPE RISER

FIELD

The disclosure relates to methods and systems for operating a subsea riser in an offshore hydrocarbon production facility, the riser being formed of flexible pipe having a central bore and an annulus containing multiple functional layers. More particularly, the disclosure relates to methods and systems for circulating fluids in the annulus of a flexible pipe riser. The disclosure further relates to apparatus for circulating fluids in the annulus of a flexible pipe riser.

BACKGROUND

Engineered flexible pipe is frequently used in riser applications in offshore hydrocarbon production facilities which convey hydrocarbon products from a subsea well to a topsides production platform or vessel. Such flexible pipe is formed of multiple layers, each layer designed for a specific function. In general, the innermost layer of the multiple layers is the carcass layer, made of corrosion resistant material, designed to resist collapse of the flexible pipe. Surrounding the carcass is a polymeric sealant layer or pressure sheath which is extruded around the carcass and sealed at flexible pipe end fittings to contain fluid within the bore. Surrounding the polymeric sealant layer is an annulus containing a number of metallic armor layers designed to impart strength against tensile loading (e.g. armor wires) and internal pressure loading (e.g. pressure armor). Surrounding these layers is another polymeric sealant layer or external sheath designed to avoid external sea water ingress into inner layers of the flexible pipe, which acts as an outer protective layer. The space between the two polymeric sealant layers is referred to as "the annulus." Typically, the annulus contains one or two layers of circumferentially oriented steel members (referred to as pressure armor layers) designed to provide radial strength and burst resistance due to internal pressure. Surrounding the pressure armor layers are two or four layers of helically wound armor wires (referred to as armor wire layers) designed to provide tensile strength in the axial direction.

Flexible pipe is terminated at each end by an end fitting which incorporates a flange for mating with other flanges. In use, flexible pipe risers are suspended from an offshore hydrocarbon production platform or host facility, thus placing high tensile loads on the armor wire layers. The loads along the riser are amplified due to the effects of environmental conditions and associated motions of the platform or host facility to which the riser is connected.

Within the bore of the flexible pipe, in addition to hydrocarbon products, other components including hydrogen sulfide, carbon dioxide and water may be present. These other components can diffuse through the first polymeric sealant layer (pressure sheath) to the annulus. These components, hydrogen sulfide in particular, as well as water vapor, can accumulate within the annulus and eventually lead to corrosion of the steel wires therein via mechanisms including hydrogen induced cracking and sulfide stress cracking. Additionally, the annulus can be flooded with seawater due to damage of the outermost layer leading to corrosion of the armor wires. As noted, the armor wires in the flexible riser are particularly subject to dynamic cyclic loads, which can result in corrosion fatigue of the metallic armor wires in the annulus. Corrosion of the metallic wires in this region makes these wires particularly vulnerable to corrosion fatigue and potential acceleration of failure mechanism.

It would be desirable to provide a way to prevent or reduce corrosion of the armor wires and other steel elements within the annulus of flexible pipe used in risers and in other dynamic applications.

SUMMARY

In one aspect of the present disclosure, a method is provided for circulating fluid within the annulus of a flexible pipe riser in an offshore hydrocarbon production facility. The method includes pumping a fluid into at least one tube having at least one opening within an annulus of a flexible pipe riser, the flexible pipe riser having one end terminating at a topsides riser end fitting in fluid communication with the at least one tube and another end terminating at a subsea riser end fitting. The fluid is discharged from the opening of the at least one tube into the annulus such that the fluid flows in the annulus and returns to the topsides riser end fitting.

In another aspect of the present disclosure, a flexible pipe apparatus for use in a riser system in an offshore hydrocarbon production facility is provided. The apparatus includes a tubular carcass layer defining a bore therein for transporting produced well fluids, a pressure sheath surrounding the carcass layer, an external sheath surrounding the pressure sheath and defining and annulus there between, at least two layers of armor wires within the annulus, and at least one tube within the annulus having at least one opening for introducing fluid to the annulus.

In yet another aspect of the present disclosure, a system for use in an offshore hydrocarbon production facility is provided. The system includes at least one flexible pipe riser terminating at one end at a topsides location and at another end at a subsea location, wherein the flexible pipe riser comprises an annulus having at least two layers of armor wires and at least one tube having at least one opening for introducing fluid to the annulus. A topsides end fitting is attached to a topsides end of the flexible pipe riser, having an inlet port in fluid communication with the at least one tube within the annulus and an outlet port in fluid communication with the annulus. A subsea end fitting is attached to a subsea end of the flexible pipe riser. The system further includes a pump at the topsides location in fluid communication with and between the outlet port and the inlet port for pumping fluid into the inlet port.

DESCRIPTION OF THE DRAWINGS

These and other objects, features and advantages of the present invention will become better understood with regard to the following description, appended claims and accompanying drawings where:

FIGS. 1A-1E illustrate a system and apparatus for circulating fluid within the annulus of a flexible pipe riser in an offshore hydrocarbon production facility according to one embodiment.

FIGS. 5A-5C illustrate a flexible pipe riser according to one embodiment.

DETAILED DESCRIPTION

Figure 1B:
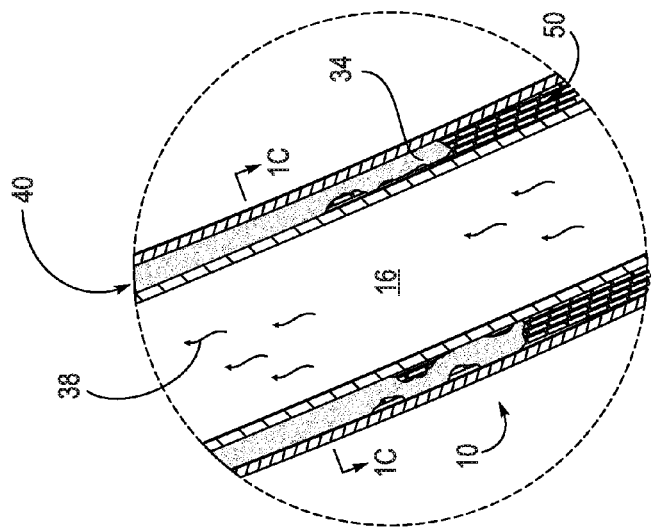

According to methods and systems of the present disclosure, the incidence of corrosion over time of armor wires and other steel elements (e.g. pressure armor layer(s)) within the annulus of flexible pipe, such as those used in flexible pipe risers in offshore hydrocarbon production facilities, can be reduced.

The incidence of corrosion of the armor wires and related problems such as corrosion fatigue can be reduced by circulating a corrosion-inhibiting or a fluid containing surface passivating agents or other additives within the annulus so that the fluid flows in the interstices between the armor wires and other steel elements. A gas-flushing fluid to flush $H_2S$, $CO_2$, water vapor, and the like from the annulus can also be used. The fluid is referred to interchangeably herein as "buffer fluid," "flushing fluid," or simply "fluid." The fluid can be circulated either continuously or intermittently. The fluid contacts and encompasses the armor wires and other steel elements, protecting them from corrosion. In another embodiment of the present disclosure, rather than or in addition to buffer fluid, image sensitive-materials can be circulated within the annulus of the flexible pipe riser, thus allowing the annulus to be imaged using known techniques.

The buffer fluid is circulated in a closed loop which includes at least one buffer fluid tube and the annulus of the flexible pipe riser. According to the present disclosure, the buffer fluid is introduced into the annulus of the flexible pipe riser through at least one opening in at least one tube in the annulus, also referred to herein as the "buffer fluid tube." Referring to FIG. 1A, a system is illustrated according to one embodiment in which one end of a flexible pipe riser 10 is connected to a topsides end fitting 12 at a production platform 1. The other end of the flexible pipe riser 10 terminates on the seabed 3 at a touchdown point where subsea end fitting 14 rests on the seabed 3. Subsea end fitting 14 is connected to an end fitting 15 of a flow line 60. Buffer fluid is stored in fluid storage tank 30 on the production platform 1. The fluid is taken from the tank 30, through conduit 36 and pumped by pump 32 into at least one buffer fluid tube (to be described in more detail hereinafter) in the annulus of flexible pipe riser 10. Once introduced into the annulus, the fluid flows in the interstices in the annulus. Fluid pressure drives the fluid within the annulus to rise through the annulus to return to the topsides end fitting 12 at the platform 1. Upon returning to the topsides end fitting 12, the fluid is directed to a port in the topsides end fitting in fluid communication with the tank 30 via conduit 31. The fluid is returned to the tank where contaminants can be removed from the fluid, and the fluid can be recirculated in the loop including the at least one buffer fluid tube and the annulus by pump 32. The fluid can be recirculated continuously or intermittently.

Figure 1A:
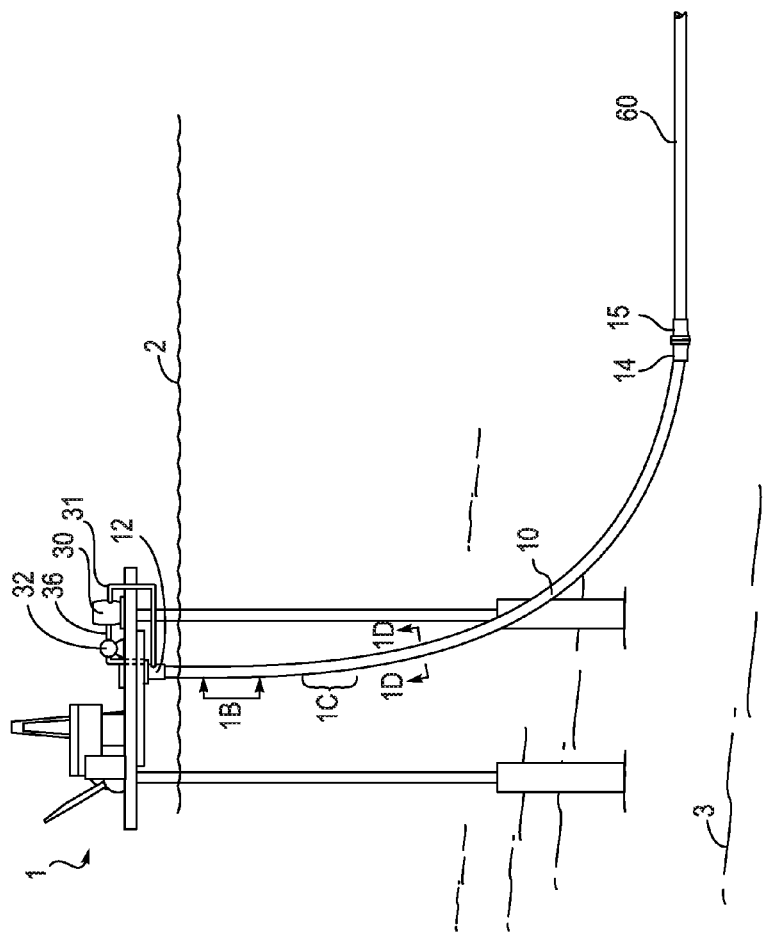

FIG. 1B is a longitudinal cross-section of the flexible pipe riser 10 illustrating a side view of the annulus 40 surrounding bore 16 having produced well fluids containing hydrocarbons 38 flowing there through. The armor wires and other steel elements within the annulus are represented by 50. The buffer fluid, introduced into the annulus from the buffer fluid tube, flowing in the interstices in the annulus is represented by 34.

In one embodiment, at least one armor wire layer within the annulus includes at least one buffer fluid tube. In this case, the buffer fluid tube is embedded within the armor wire layer. The buffer fluid tube is generally similar in size and shape to an individual armor wire. FIG. 1C is an exploded view of a flexible pipe riser 10 showing each of the layers of the flexible pipe. Innermost is the bore 16 within and defined by the carcass 52. The carcass 52 is surrounded by pressure sheath 54 which is in turn surrounded by the annulus 40. The annulus 40 includes layers 50 which include pressure armor layer 56, inner tensile armor wire layer 60' and outer tensile armor wire layer 62'. In the embodiment illustrated, within inner tensile armor wire layer 60' are tensile armor wires 61 and buffer fluid tubes 61'. Buffer fluid tubes 61' have perforations 65 through which buffer fluid is introduced into the annulus. Similarly, within outer tensile armor wire layer 62' are tensile armor wires 63 and buffer fluid tubes 63' having perforations 65 through which buffer fluid 34 is introduced into the annulus. Surrounding the outer tensile armor wire layer is the external sheath 11. The cross-section of the flexible pipe is shown in FIG. 1D. FIG. 1E is an expanded view of the wall of the flexible pipe, showing each of the layers previously described as well as the interstitial spaces 90 there between. Within these spaces, buffer fluid 34 flows.

Figure 2D:
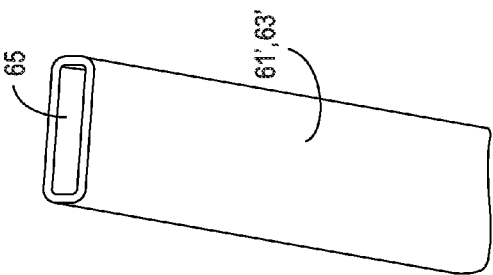
FIGS. 2A-2D illustrate possible embodiments of apparatus for circulating fluid within the annulus of a flexible pipe riser.
Figure 2C:
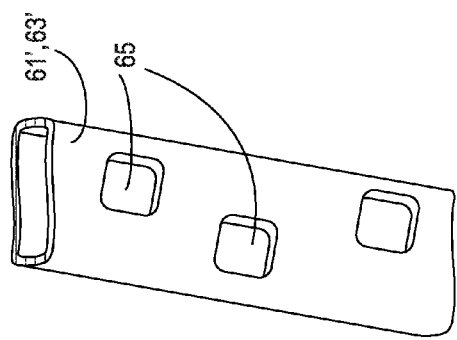
Figure 2B:
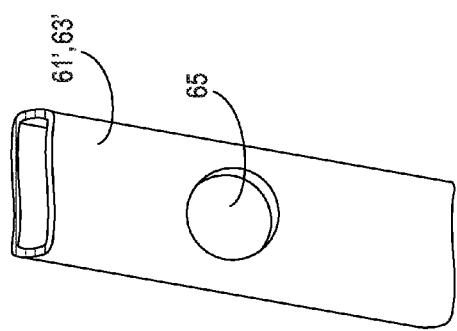
Figure 2A:
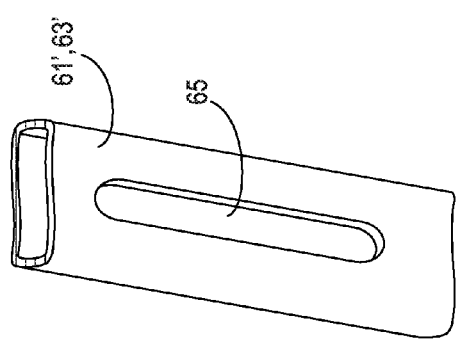
Figure 3:
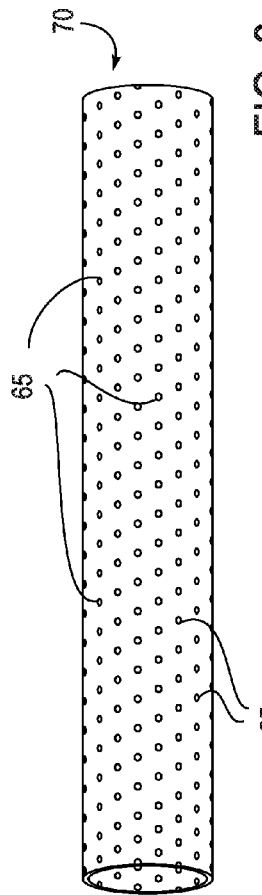
FIG. 3 illustrates an apparatus for circulating fluid within the annulus of a flexible pipe riser according to one embodiment.

FIGS. 2A-2D and FIG. 3 illustrate exemplary embodiments of the buffer fluid tube 61' or 63' having at least one opening therein for fluid to be introduced into the annulus. FIGS. 2A-2C illustrate buffer fluid tubes having one or more perforations 65 along the length thereof. FIG. 2D illustrates a buffer fluid tube having a solid wall, i.e., having no perforations. Such solid buffer fluid tubes have an opening 65 at one end thereof through which fluid can be introduced into the annulus. FIG. 3 illustrates a buffer fluid tube 70 according to another embodiment having many small perforations 65 along the length thereof through which buffer fluid is introduced into the annulus such that it weeps from the tube the entire length of the riser.

Figure 4A:
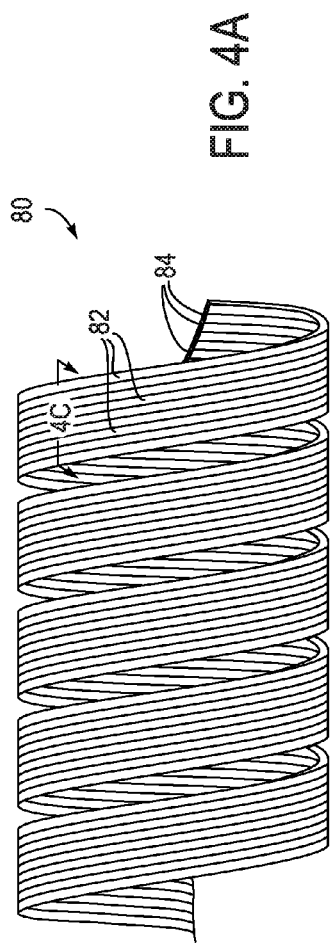
FIGS. 4A-4D illustrate possible embodiments of apparatus for circulating fluid within the annulus of a flexible pipe riser.
Figure 4B:
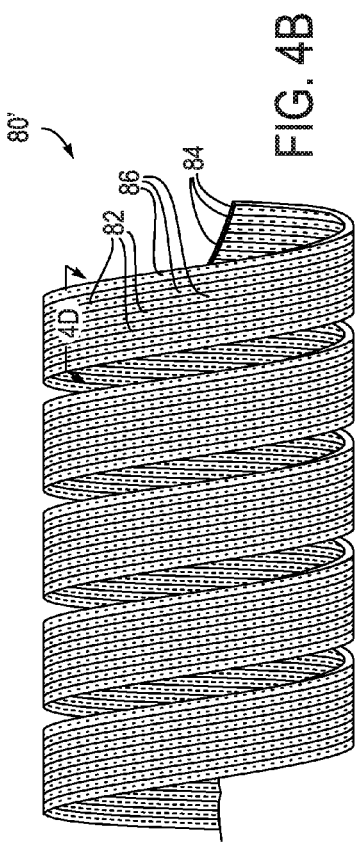
Figure 4C:
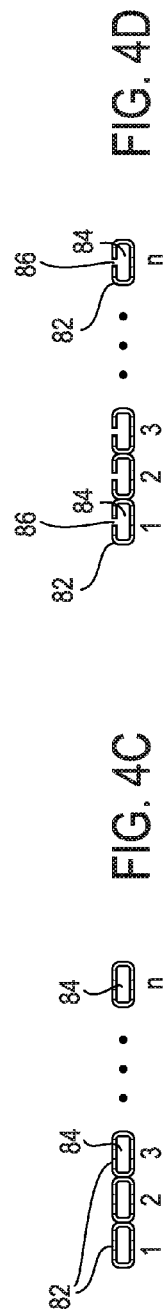
Figure 4D:
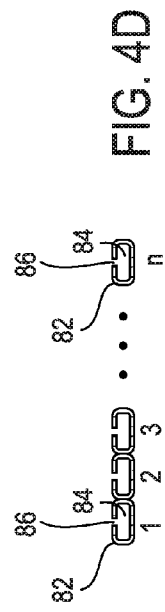

In an alternative embodiment, the buffer fluid can be provided to the annulus by a tape having at least one buffer fluid tube therein. In one embodiment, the tape can include a plurality of buffer fluid tubes in a side-by-side arrangement. Referring to FIG. 4A, tape 80 has a plurality of buffer fluid tubes 82 having openings 84 at the ends thereof. The tubes 82 are arranged side-by-side in a generally ribbon shaped tape. FIG. 4C is a cross-section of tape 80. As shown, the number of tubes 82 within the tape may vary. The number of tubes 82 can vary between two and n tubes, where n is any convenient number. For example, FIG. 4A illustrates a tape with nine tubes 82. Referring to FIG. 4B, tape 80' has a plurality of buffer fluid tubes 82 arranged side-by-side having openings 84 at the tube ends as well as perforations 86 along the length thereof. FIG. 4D is a cross-section of tape 80'. While in the cross-sectional views shown, all of the tubes are lined up in a straight row, they could have an alternative arrangement. For instance, the tubes could be staggered with respect to each other.

Figure 5C:
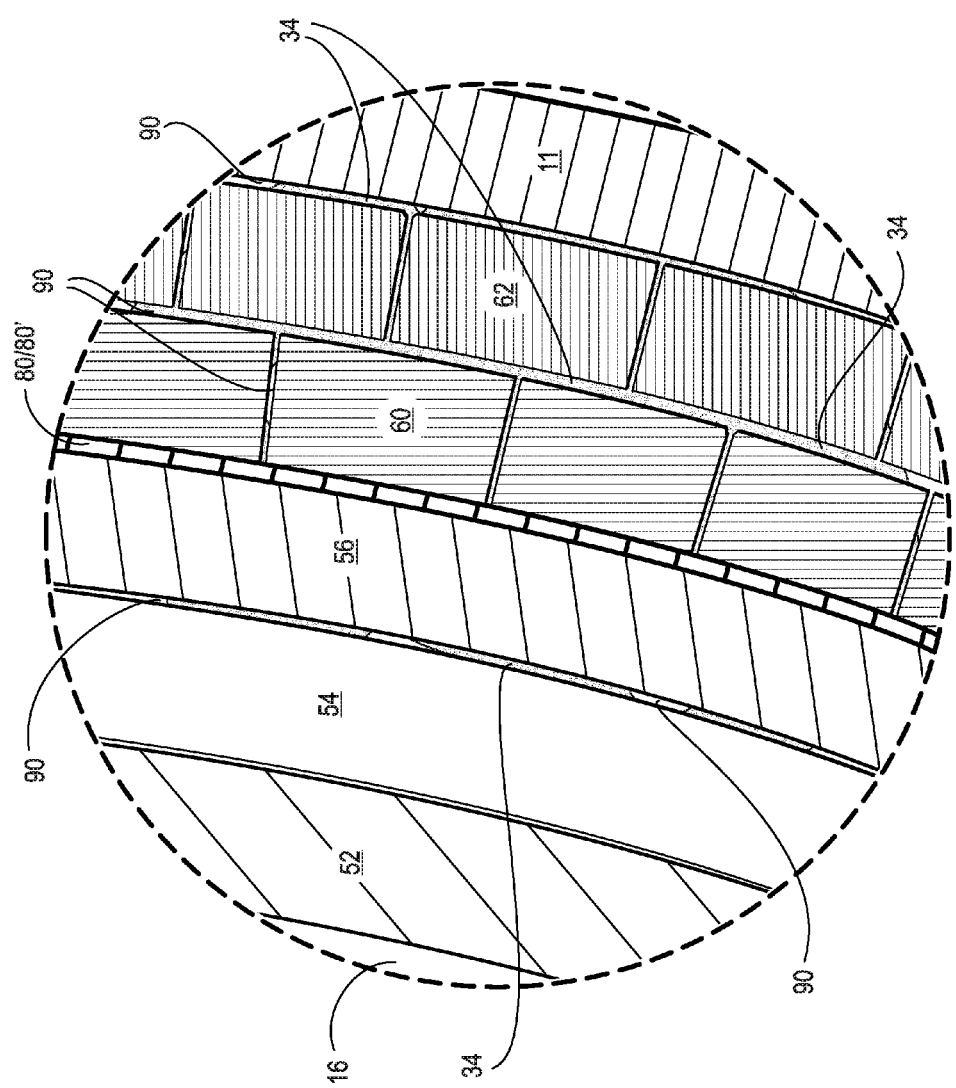

FIG. 5A is an exploded view of a riser 10 incorporating tape 80 or 80' (represented by 80/80') within the annulus 40. As shown, the tape 80/80' is helically wound between armor wire layers 60 and 62. FIG. 5B is a cross-section of riser 10, and FIG. 5C is a detailed view of the wall of riser 10. While the tape 80/80' is shown between the armor wire layers 60 and 62, the tape may also be provided between any two layers within the annulus, namely, between the pressure sheath 54 and the pressure armor layer 56, between the pressure armor layer 56 and inner tensile armor layer 60, between the armor wire layers 60 and 62, between armor wire layer 62 and the external sheath 11, and/or between any other additional layer which the annulus may contain and an adjacent layer.

Figure 6A:
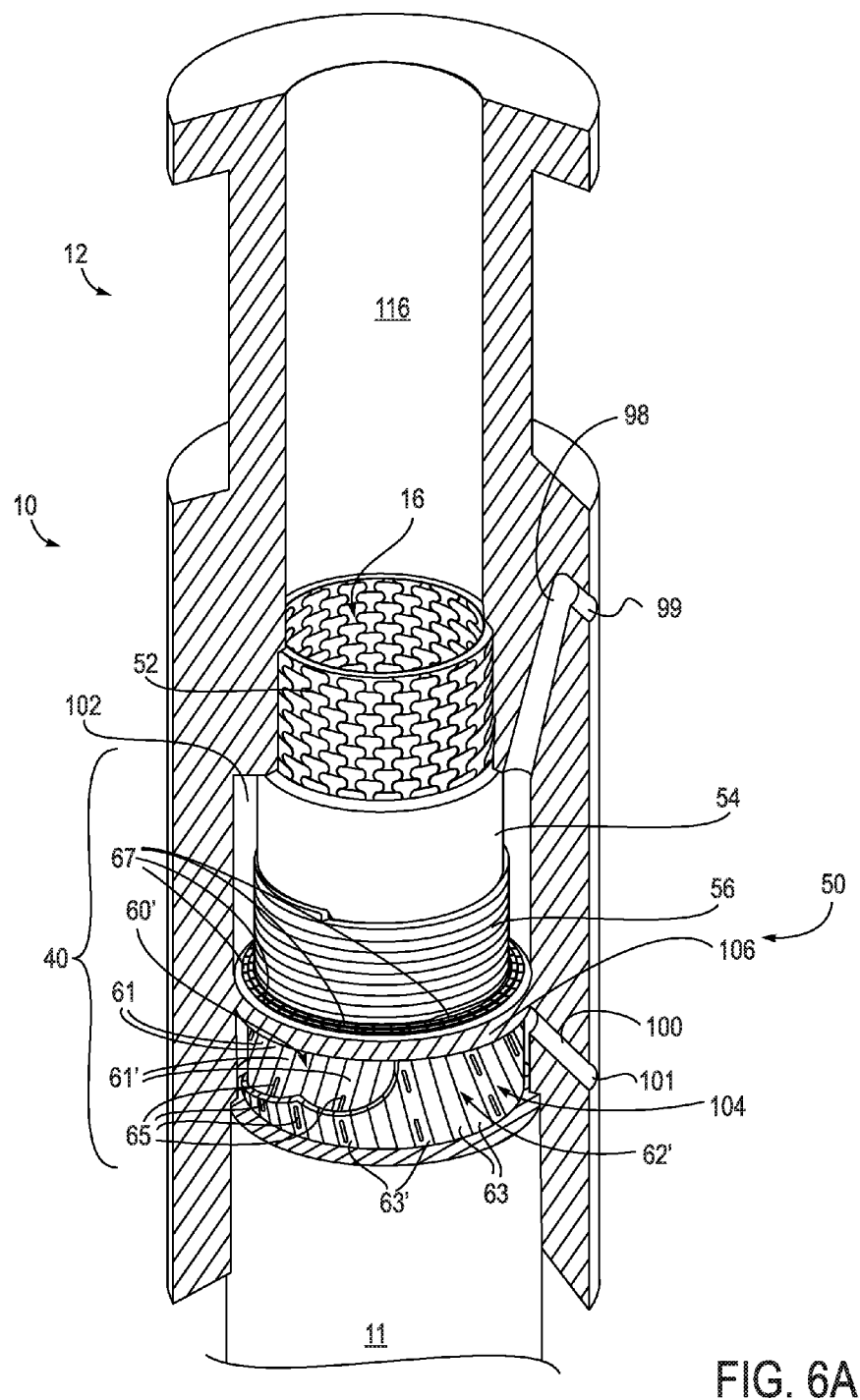
FIGS. 6A-6C illustrate a flexible pipe riser in mating relation to a topsides end fitting according to one embodiment.

Referring again to FIG. 1A, the flexible pipe riser 10 is attached to topsides end fitting 12. FIG. 6A is an exploded view of the flexible pipe riser 10 in mating relation with the topsides end fitting 12 according to one embodiment. In this view, the flexible pipe riser 10 as already described and shown in FIG. 1C is mated with topsides end fitting 12 such that the bore 116 of the end fitting is in fluid communication with the bore 16 of the flexible pipe riser 10. The end fitting 12 includes an opening 99 and channel 98 in fluid communication with at least one buffer fluid tube in the annulus of the flexible pipe riser 10, such that fluid can be pumped into the buffer fluid tubes 61' and 63' via the opening 99 and channel 98. In the particular embodiment shown, segregating wall 106 separates the inlet portion 102 of the annulus (in fluid communication with opening 99) from outlet portion 104 of the annulus in fluid communication with an opening 101. The segregating wall 106 helps direct the flow of fluid into the open ends 67 of the buffer fluid tubes. Opening 101 and channel 100 are in fluid communication with outlet portion 104 of the annulus. It will be appreciated by one of ordinary skill in the art that many other particular embodiments for introducing fluid into the buffer fluid tubes 61' and 63' could also be employed.

Figure 6B:
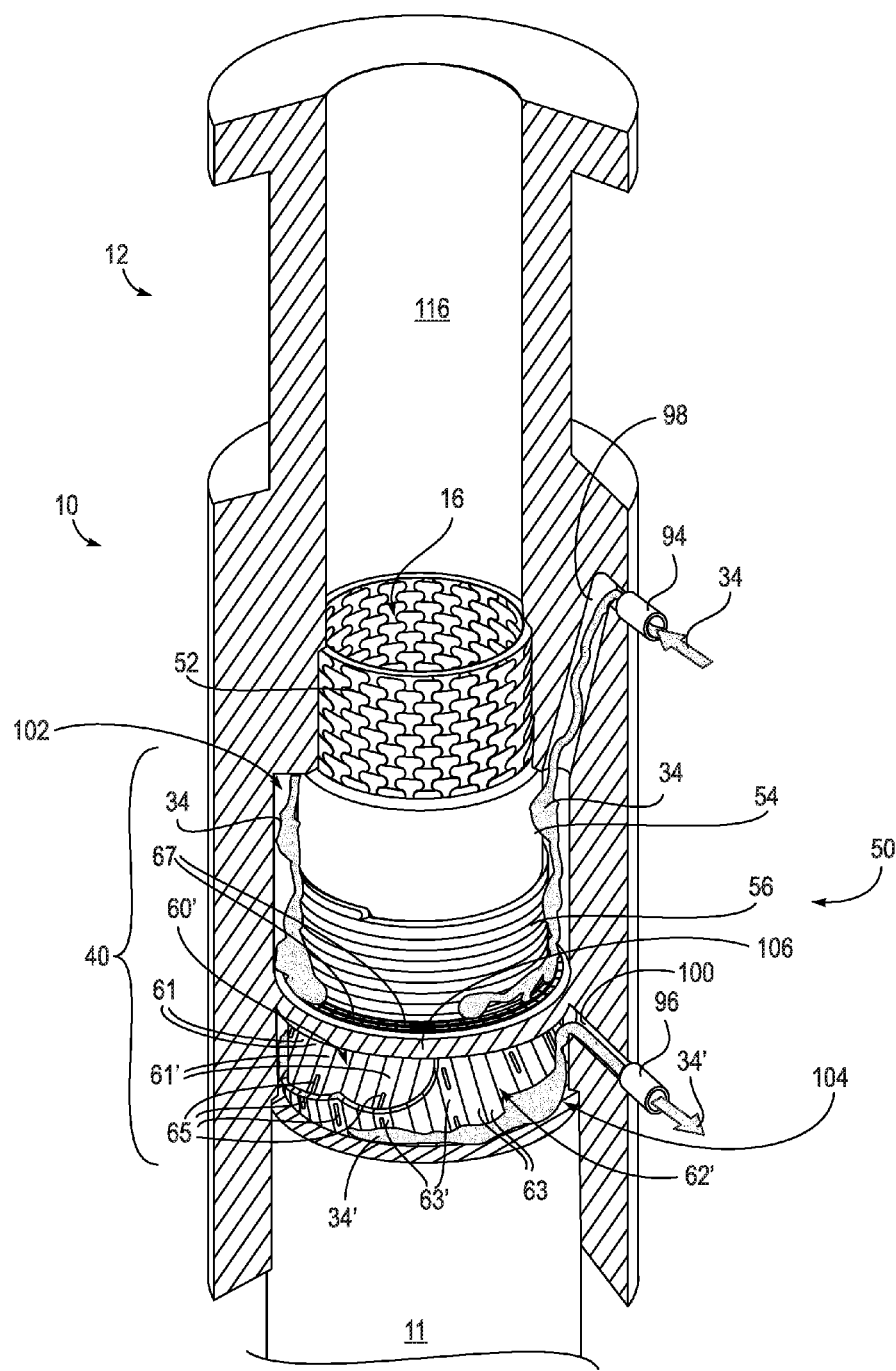
Figure 6C:
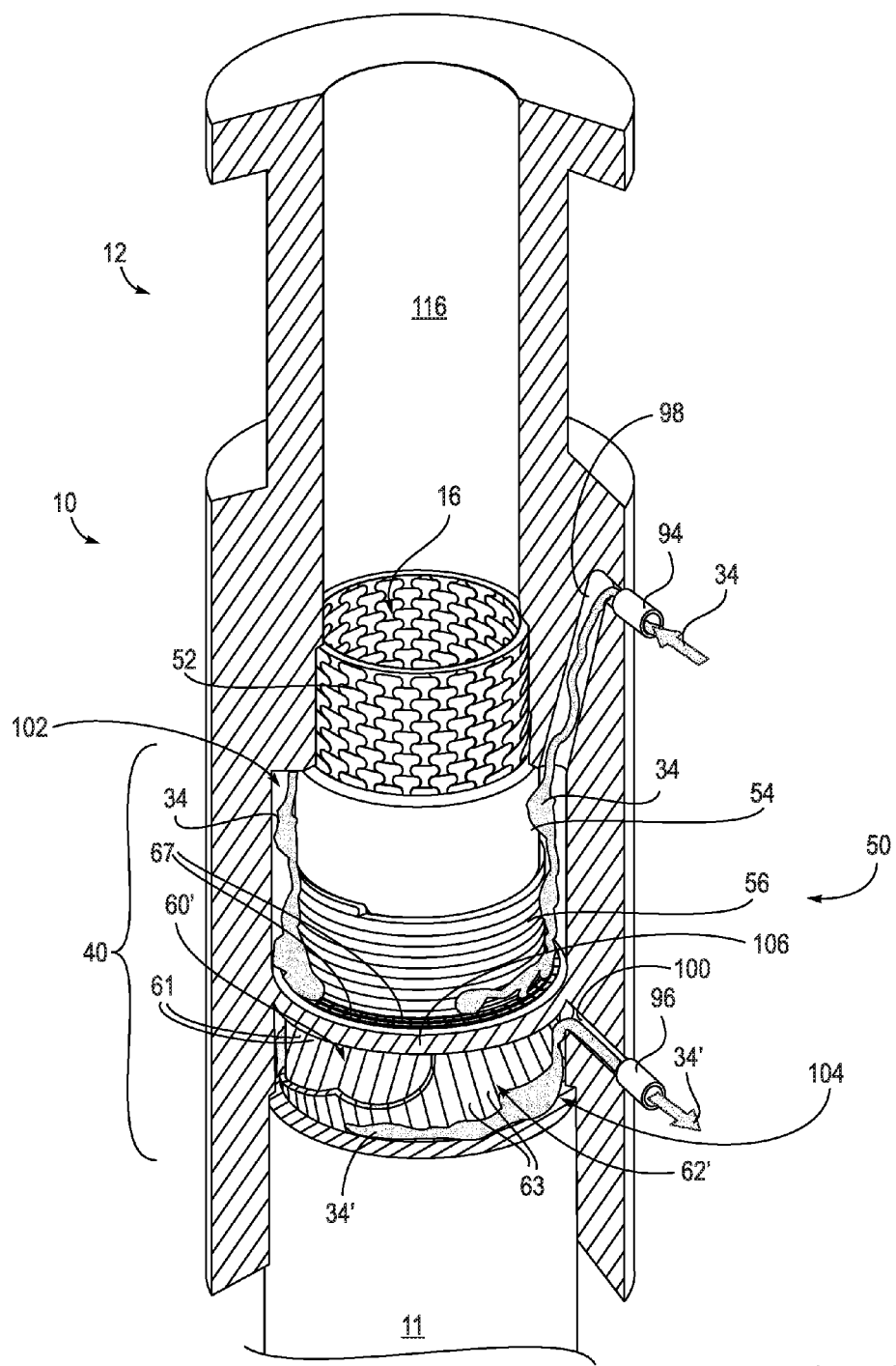

FIG. 6B shows the apparatus of FIG. 6A with fluid 34 being introduced through inlet port 94 and channel 98, entering the inlet portion 102 of the annulus and open ends 67 of perforated buffer fluid tubes 61' and 63' within the armor wire layers according to one embodiment. In one embodiment, the inlet port 94 is in fluid communication with the pump as previously described. The fluid 34' flows through the annulus along the length of the flexible pipe riser 10 and returns to the topsides end fitting 12, exiting through the outlet portion 104 of the annulus and the channel 100 and the outlet port 96. The exiting fluid 34' can then be returned to the storage tank. FIG. 6C illustrates a similar apparatus according to another embodiment in which the buffer fluid tubes 61 and 63 have solid walls.

Where permitted, all publications, patents and patent applications cited in this application are herein incorporated by reference in their entirety, to the extent such disclosure is not inconsistent with the present invention.

Unless otherwise specified, the recitation of a genus of elements, materials or other components, from which an individual component or mixture of components can be selected, is intended to include all possible sub-generic combinations of the listed components and mixtures thereof. Also, "comprise," "include" and its variants, are intended to be non-limiting, such that recitation of items in a list is not to the exclusion of other like items that may also be useful in the materials, compositions, methods and systems of this invention.

From the above description, those skilled in the art will perceive improvements, changes and modifications, which are intended to be covered by the appended claims.

What is claimed is:

1. A method for circulating fluid within the annulus of a flexible pipe riser in an offshore hydrocarbon production facility, comprising:
   pumping a liquid into an inlet port in a topsides riser end fitting in fluid communication with a plurality of tubes within at least one tape layer free of metal wires within an annulus of a flexible pipe riser wherein each of the plurality of tubes has at least one opening within the annulus, the flexible pipe riser having one end terminating at the topsides riser end fitting in fluid communication with the plurality of tubes within the at least one tape layer and another end terminating at a subsea riser end fitting; and
   discharging the liquid from the openings of the plurality of tubes within at least one tape layer into the annulus such that the liquid flows in the annulus and returns to the topsides riser end fitting in a closed loop.

2. The method of claim 1 wherein the plurality of tubes have solid walls and the liquid is discharged from openings at the ends of the plurality of tubes at the subsea location.

3. The method of claim 1 wherein the plurality of tubes have perforated walls and the liquid is discharged from perforations along the lengths of the plurality of tubes.

4. The method of claim 1 wherein the liquid is a corrosion-inhibiting liquid or a liquid containing surface passivating agents.

5. The method of claim 1 wherein the fluid comprises an image sensitive material.

6. The method of claim 1 further comprising, upon returning the fluid to the topsides end fitting, exiting the liquid from the topsides end fitting through an outlet port.

7. The method of claim 6 further comprising returning the liquid to a storage tank; removing contaminants from the liquid; and repeating the steps of claim 1 to recirculate the liquid within the annulus of the flexible pipe riser.

8. A flexible pipe apparatus for use in a riser system in an offshore hydrocarbon production facility, comprising:
   a) a tubular carcass layer defining a bore therein for transporting produced well fluids;
   b) a pressure sheath surrounding the carcass layer;
   c) an external sheath surrounding the pressure sheath and defining and annulus there between;
   d) at least two layers of armor wires within the annulus; and
   e) at least one tape layer free of metal wires located within the annulus and helically wound around at least one layer within the annulus; wherein the at least one tape layer contains a plurality of tubes wherein each of the plurality of tubes has at least one opening for introducing fluid to the annulus.

9. The flexible pipe apparatus of claim 8, further comprising:
   f) a topsides end fitting attached to a topsides end of the flexible pipe apparatus, having an inlet port in fluid communication with the plurality of tubes within the annulus and an outlet port in fluid communication with the annulus; and
   g) a subsea end fitting attached to a subsea end of the flexible pipe apparatus.

10. The flexible pipe apparatus of claim 9 further comprising a segregating wall separating the inlet port from the outlet port.

11. The flexible pipe apparatus of claim 8, wherein the plurality of tubes have solid walls and openings at the ends thereof.

12. The flexible pipe apparatus of claim 8, wherein the plurality of tubes have perforated walls.

13. The flexible pipe apparatus of claim 8, wherein the at least one tape layer comprises two tape layers.

14. A system for use in an offshore hydrocarbon production facility, comprising:
   a) the flexible pipe apparatus of claim 8 terminating at one end at a topsides location and at another end at a subsea location;
   b) a topsides end fitting attached to a topsides end of the flexible pipe apparatus, having an inlet port in fluid communication with the plurality of tubes within the annulus and an outlet port in fluid communication with the annulus;
   c) a subsea end fitting attached to a subsea end of the flexible pipe apparatus; and d) a pump at the topsides location in fluid communication with and between the outlet port and the inlet port for pumping liquid into the inlet port.

15. The system of claim 14, further comprising a fluid storage tank located at the topsides location for storing the liquid, the fluid storage tank being in fluid communication with and between the outlet port and the pump.

16. A method for circulating fluid within the annulus of a flexible pipe riser in an offshore hydrocarbon production facility, comprising:
   a) pumping a liquid into an inlet port in a topsides riser end fitting in fluid communication with a plurality of tubes within at least one tape layer within an annulus of a flexible pipe riser wherein each of the plurality of tubes has at least one opening within the annulus, the flexible pipe riser having one end terminating at the topsides riser end fitting in fluid communication with the plurality of tubes within the at least one tape layer and another end terminating at a subsea riser end fitting;
   b) discharging the liquid from the openings of the plurality of tubes within at least one tape layer into the annulus such that the liquid flows in the annulus and returns to the topsides riser end fitting in a closed loop;
   c) returning the liquid to a storage tank;
   d) removing contaminants from the liquid; and
   e) repeating steps (a) through (d) to recirculate the liquid within the annulus of the flexible pipe riser.

17. A flexible pipe apparatus for use in a riser system in an offshore hydrocarbon production facility, comprising:
   a) a tubular carcass layer defining a bore therein for transporting produced well fluids;
   b) a pressure sheath surrounding the carcass layer;
   c) an external sheath surrounding the pressure sheath and defining and annulus there between;
   d) at least two layers of armor wires within the annulus;
   e) at least one tape layer located within the annulus and helically wound around at least one layer within the annulus; wherein the at least one tape layer contains a plurality of tubes wherein each of the plurality of tubes has at least one opening for introducing liquid to the annulus;
   f) a topsides end fitting attached to a topsides end of the flexible pipe apparatus, having an inlet port in fluid communication with the plurality of tubes within the annulus and an outlet port in fluid communication with the annulus;
   g) a segregating wall separating the inlet port from the outlet port; and
   h) a subsea end fitting attached to a subsea end of the flexible pipe apparatus.

\* \* \* \* \*